(12) United States Patent
Stevenson

(10) Patent No.: US 7,263,907 B2
(45) Date of Patent: Sep. 4, 2007

(54) DUAL CLUTCH TRANSMISSION WITH A TORQUE CONVERTER

(75) Inventor: Paul D. Stevenson, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 233 days.

(21) Appl. No.: 11/039,572

(22) Filed: Jan. 20, 2005

(65) Prior Publication Data

US 2005/0252325 A1 Nov. 17, 2005

Related U.S. Application Data

(60) Provisional application No. 60/571,761, filed on May 17, 2004.

(51) Int. Cl.
*F16H 3/38* (2006.01)
(52) U.S. Cl. .......................... 74/340; 74/730.1; 74/331
(58) Field of Classification Search .................. 74/329, 74/331, 730.1, 339, 340
See application file for complete search history.

(56) References Cited

U.S. PATENT DOCUMENTS

| | | | |
|---|---|---|---|
| 2,722,844 A * | 11/1955 | Dodge | 74/330 |
| 4,495,838 A * | 1/1985 | Gooch | 477/116 |
| 4,513,631 A | 4/1985 | Koivunen | 74/360 |
| 4,565,106 A * | 1/1986 | Sumiyoshi | 74/359 |
| 5,484,354 A | 1/1996 | Vukovich et al. | 477/174 |
| 6,471,616 B2 | 10/2002 | Stevenson | 475/296 |
| 6,669,596 B1 | 12/2003 | Sefcik | 475/278 |
| 6,729,993 B2 | 5/2004 | Bucknor et al. | 475/275 |
| 6,755,089 B2 * | 6/2004 | Hirt | 74/329 |
| 7,070,534 B2 * | 7/2006 | Pelouch | 475/214 |
| 2002/0104397 A1 * | 8/2002 | Bowen | 74/329 |
| 2005/0000307 A1 * | 1/2005 | Gumpoltsberger | 74/331 |

* cited by examiner

*Primary Examiner*—Saul Rodriguez
*Assistant Examiner*—Justin K. Holmes

(57) ABSTRACT

A multi-speed transmission for transmitting power from a power source includes a torque converter as well as dual clutches which may be arranged as dual input clutches or dual output clutches. To combine the smoothness and ratio boosting effects of a torque converter with the low spin loses associated with synchronizers used in dual clutch designs. The torque converter and dual clutches as well as synchronizers and a plurality of intermeshing gears are utilized to transfer torque from an input member to an output member at a plurality of speed ratios.

19 Claims, 5 Drawing Sheets

DUAL CLUTCH TRANSMISSION WITH A TORQUE CONVERTER

CROSS-REFERENCE TO RELATED APPLICATION

This application claims the benefit of U.S. Provisional Application No. 60/571,761, filed May 17, 2004, which is hereby incorporated by reference in its entirety.

TECHNICAL FIELD

This invention relates to a multi-speed, dual clutch transmission connectable with a torque converter.

BACKGROUND OF THE INVENTION

Dual input clutch transmissions have been designed with friction launch clutches to connect a vehicle engine to selectively engaged gears in a lay shaft transmission. Dual input clutch transmissions are designed to permit engine power to be distributed through power paths that are dependent upon which input clutch is engaged. Dual input clutch power transmissions are typically designed as countershaft-type transmissions (i.e., lay shaft transmissions) wherein engagement of a first of the input clutches creates a power path from an input shaft through a first countershaft to an output shaft, and engagement of a second of the input clutches creates a power path through a second countershaft to the output shaft. Synchronizers engage gears with the countershafts to complete the powerflow to the output shaft. Layshaft designs and other transmission configurations that use synchronizers for selectively engaging gears with a shaft provide relatively low spin losses, thus enhancing overall operating efficiency.

The art has also employed the clutch of a planetary transmission as a friction launch mechanism that provides launch slip in connecting a set of interconnected planetary gear sets with an input shaft connected to an engine to transfer power from the input shaft to an output shaft. One such power transmission with a friction launch torque-transmitting mechanism is disclosed in commonly-assigned U.S. Pat. No. 6,471,616, issued to Paul D. Stevenson on Oct. 29, 2002, which is hereby incorporated by reference in its entirety.

Furthermore, the art has also employed a torque converter connectable with planetary or layshaft gear sets in a transmission to transfer power from a power source, such as an engine, to an output shaft. The torque converter provides a torque multiplier and speed differential between the engine and the gearing. The fluid coupling function of the torque converter enables a smooth transmission of power during launch, shifting, as well as coasting. A torque converter clutch may or may not be employed to connect the engine to the transmission (bypassing the torque converter) and thereby improve the overall efficiency of the transmission. An example of a powertrain including an engine, a torque converter and a transmission including three planetary gear sets is described in commonly-assigned U.S. Pat. No. 6,729,993, issued to Norman Kenneth Bucknor et al. on May 4, 2004, which is hereby incorporated by reference in its entirety.

SUMMARY OF THE INVENTION

By utilizing a torque converter with a dual clutch transmission, the invention combines smoothness and ratio-boosting effects of a torque converter with the low spin losses associated with the synchronizers of the dual clutch designs. With respect to a conventional dual clutch transmission, a damper and two launching clutches are replaced by a torque converter and two shifting clutches. Shifting clutches may be more compact, require less heat sink and require less cooling than launching clutches. They may, therefore, be less expensive and may weigh less than launching clutches, as the torque converter provides some of the heat absorbing capability otherwise required by launching clutches. It should be noted that a damper is employed within the torque converter, but such a damper may be smaller than a damper required to be used in conjunction with friction launch clutches, as the inertia of the torque converter itself provides a portion of the required inertia capability.

A powertrain having a torque converter and a dual shifting clutch design may be especially advantageous for a vehicle having a low power to weight ratio, as the torque converter provides greater heat sink capability than conventional friction launch clutches. Vehicles having a low ratio of engine speed to vehicle velocity (i.e., a low N/V, where N is the speed of the engine in revolutions per minute (rpm) and V is the velocity of the vehicle in miles per hour (mph)), may be well-suited for a design having a torque converter with dual shifting clutches, due to the heat sink capability and ratio-boosting effect of the torque converter. Additionally, the relatively low spin losses of the synchronizers and wide ratios available in higher gears may improve fuel economy with respect to other powertrain designs. The use of a torque converter with its torque multiplication can allow the use of gear ratios with smaller steps or fewer gear ratios for the same performance.

Accordingly, a multi-speed transmission is provided for transmitting power from a power source. The transmission includes an input member and an output member as well as a torque converter operatively connected between the input member and the power source to create a fluid coupling therebetween. The transmission further includes a first shaft and a second shaft as well as a plurality of synchronizers and a plurality of intermeshing gears. One or more of the input member, the output member and the first and second shafts has some of the gears continuously connected thereto for rotation therewith. Others of the gears are selectively interconnectable for rotation with others of the shafts and/or input or output member via selective engagement of the synchronizers.

The transmission also includes a first and a second clutch which are alternately selectively engageable for operatively interconnecting the first and second shafts, respectively, with either the input member or the output member. The first and second clutches may be referred to as dual shifting clutches. When the dual shifting clutches are engageable for operatively interconnecting the first shaft and second shaft with the input member, they are referred to as dual input clutches. Likewise, when the first and second clutches are engageable for operatively interconnecting the first and second shaft with the output member, they are referred to as dual output clutches. By selectively engaging the clutches and the synchronizers as described above, the input member is operatively interconnected with the output member through the intermeshing gears to transfer power provided from the power source to the output member. The power source may be a conventional internal combustion engine, but may also be a hybrid engine, diesel engine or other form of power source.

In one aspect of the invention, the transmission includes a torque converter clutch which is engageable to establish a mechanical connection between the power source and the input member to bypass the torque converter and effectively establishing a direct one-to-one ratio between the power source and the input member.

A variety of different transmission configurations may employ the torque converter and dual shifting clutch combination. For instance, the first and second shaft may be spaced generally parallel to the input member and to the output member in a typical countershaft design. Alternatively, the first and second shafts may be coaxial. Whether of the countershaft or the coaxial design, the alternate engagement of the first and second shifting clutches may operatively interconnect the first and second shaft with the input member or, alternatively, with the output member. The operative interconnection by the first and second clutches of the first and second shaft with either the input member or the output member may be a direct interconnection or an indirect interconnection, i.e., where the interconnection is through some of the intermeshing gears, which in that instance, may be referred to as transfer gears.

The input member, output member and first and second countershafts may be physically arranged with respect to one another to establish two axes or three or more axis. For instance, the input member and the output member may be aligned with one another, to establish an axis. Alternatively, the first and second shafts, the input member and the output member may be arranged to establish three or more axis. For instance, in a dual input clutch design, the first and second shafts may be arranged as countershafts spaced apart from one another and parallel to the aligned input and output members, thereby establishing three axes.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

First Embodiment: Dual Input Clutch, Counter Shaft Design on Three Axes

Figure 1:
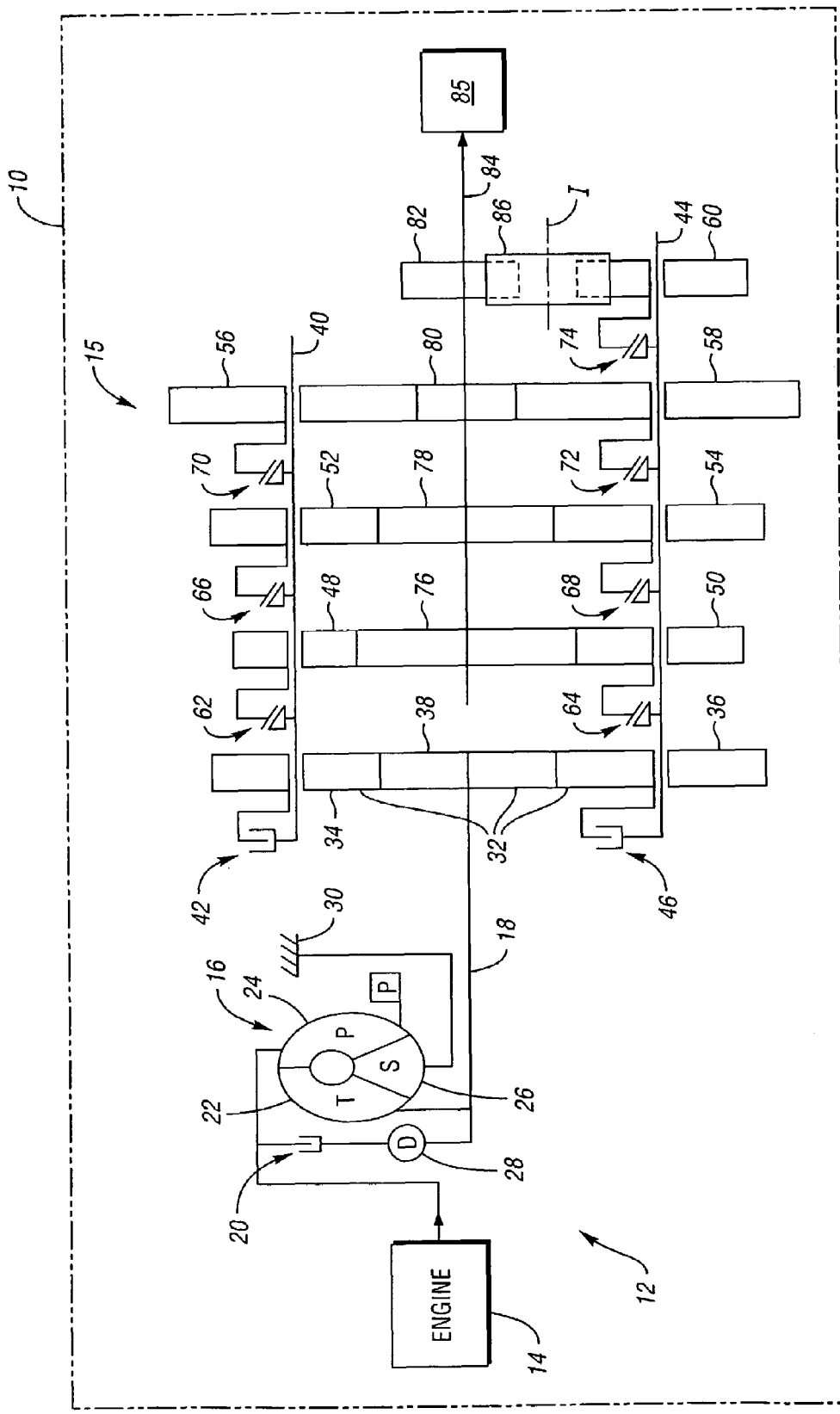
FIG. 1 is a schematic illustration of a first embodiment of a vehicle having a powertrain with an engine, a torque converter and a transmission with dual input clutches.

Referring to the drawings, wherein like reference numbers represent the same or corresponding parts throughout the several views, there is shown in FIG. 1 a vehicle 10 having a powertrain 12. The powertrain 12 includes a power source or engine 14, a torque converter 16 and a transmission 15. The torque converter 16 is connected with the engine 14 and with the transmission input member 18 via a turbine 22. Selective engagement of a torque converter clutch 20 allows the engine 14 to be directly connected with the input shaft 18, bypassing the torque converter 16. The input member 18 is typically a shaft, and may be referred to as an input shaft herein. Preferably, the torque converter clutch 20 is electronically controlled and may be enhanced with a multitude of clutch plates to provide a large clutch torque capacity, thus making the converter clutch 20 able to transmit a large amount of torque. The torque converter 16 includes the turbine 22, a pump 24 and a stator 26. The converter stator 26 is grounded to a casing 30 through a typical one-way clutch that is not shown. A damper 28 is operatively connected to the engaged torque converter clutch 20 for absorbing vibration.

An input transfer gear set 32 includes a first transfer gear 34, a second transfer gear 36, and third transfer gear 38. The third transfer gear 38 is continuously interconnected with and rotatable with the input shaft 18. The first transfer gear 34 intermeshes with the third transfer gear 38. The first transfer gear 34 is rotatable about a first countershaft 40. The first transfer gear 34 is selectively engageable with the first countershaft 40 via a first shifting clutch 42. Similarly, the second transfer gear 36 intermeshes with the third transfer gear 38. The second transfer gear 36 is rotatable about a second countershaft 44. The second transfer gear 36 is selectively engageable with the second countershaft 44 via a second shifting clutch 46. Notably, the first and second shifting clutches 42, 46, respectively, are placed on separate axes (i.e., the first countershaft 40 and the second countershaft 44, respectively, in the embodiment illustrated in FIG. 1). The transmission 15 establishes three primary axes plus a minor axis I for an idler gear 86. The input shaft 18 and the output shaft 84 are aligned with one another to establish an axis, as illustrated in FIG. 1. The first and second countershafts 40, 44 are on two separate axes, parallel to the input and output shafts 18, 84.

Within the scope of the invention, the shifting clutches may be connected to the input shaft and may be engageable with concentric first and second shafts for torque transfer from the engine to the first and second shafts as described below with respect to the embodiments of FIGS. 3 and 6. However, placing the shifting clutches on the parallel countershafts 40, 44, may afford placement of the clutches in close proximity to the stationary transmission casing (not shown, but generally surrounding the outer periphery of the transmission 15), enabling the use of nonrotating shifting pistons to be employed within the shifting clutches. Other shaft configurations may also be employed with a torque converter and dual shifting clutch combination, such as a "delta configuration" (i.e., a triangular configuration having an input member and an output member disposed at one corner of a triangle formed with respect to first and second countershafts disposed at the other two corners).

Referring again to FIG. 1, the powertrain 12 further includes a first, second, third, fourth, fifth and sixth intermeshing gear 48, 50, 52, 54, 56 and 58, respectively. The first, third and fifth intermeshing gears, 48, 52 and 56, respectively, are each rotatable about and selectively engageable with the first countershaft 40. Similarly, the second, fourth and sixth intermeshing gears, 50, 54 and 58, respectively, are each rotatable about and selectively engageable with the second countershaft 44. A seventh/reverse gear 60 is rotatable about and selectively engageable with the second countershaft 44 as well.

A first synchronizer 62 is selectively engageable to interconnect the first intermeshing gear 48 with the first countershaft 40. A second synchronizer 64 is selectively engageable to interconnect the second intermeshing gear 50 with the second countershaft 44 for common rotation therewith. A third synchronizer 66 is selectively engageable to interconnect the third intermeshing gear 52 with the first countershaft 40 for common rotation therewith. A fourth synchronizer 68 is selectively engageable to interconnect the fourth intermeshing gear 54 with the second countershaft 44 for common rotation therewith. A fifth synchronizer 70 is selectively engageable to interconnect the fifth intermeshing gear 56 with the first countershaft 40 for common rotation therewith. A sixth synchronizer 72 is selectively engageable to interconnect the sixth intermeshing gear 58 with the second countershaft 44 for common rotation therewith. A seventh synchronizer 74 is selectively engageable to interconnect the reverse gear 60 with the second countershaft 44 for common rotation therewith.

An eighth intermeshing gear 76, a ninth intermeshing gear 78, a tenth intermeshing gear 80, and an eleventh intermeshing gear 82 are each continuously connected to and rotatable with an output member 84, which in this embodiment is a shaft and may be referred to as an output shaft. The output shaft 84 is connected with a final drive mechanism 85. The eighth intermeshing gear 76 intermeshes with the first intermeshing gear 48 and with the second intermeshing gear 50. The ninth intermeshing gear 78 intermeshes with the third intermeshing gear 52 and with the fourth intermeshing gear 54. The tenth intermeshing gear 80 intermeshes with the fifth intermeshing gear 56 and with the sixth intermeshing gear 58. The idler gear 86 rotates about an axis I that is generally parallel with the output shaft 84 and with the second countershaft 44. The idler gear 86 intermeshes with both the reverse gear 60 and with the eleventh intermeshing gear 82.

The transmission 15 is operable for providing six forward speed ratios as well as a reverse speed ratio. Within the scope of the invention, a dual clutch transmission may provide a different number of forward speed ratios, such as five or seven. For instance, a transmission with seven forward speed ratios would require only one more gear interconnectable with the first countershaft 40 via one additional synchronizer. The additional gear would intermesh with the eleventh intermeshing gear 82. Each of the intermeshing gears is designed with a specific number of teeth to establish desirable torque ratio steps between adjacent torque ratios, as well as to affect the overall speed ratio obtainable with the transmission 15. (The torque converter 16 also has a ratio-boosting effect that contributes to the overall speed ratio).

To establish the reverse speed ratio, the seventh synchronizer 74 is engaged. Additionally, the second shifting clutch 46 is engaged. With the engagement of the second shifting clutch 46 and the seventh synchronizer 74, torque is transferred from the input shaft 18 to the output shaft 84 in a reverse direction. Torque is transferred from the input shaft 18 to the second countershaft 44 via the intermeshing second transfer gear 36 and third transfer gear 38. Torque is transferred from the second countershaft 44 to the output shaft 84 via the seventh intermeshing or reverse gear 60, idler gear 86 and eleventh intermeshing gear 82. The idler gear 86 reverses the direction of rotation between the seventh/reverse gear 60 and the eleventh intermeshing gear 82, thereby reversing the direction of rotation between the input shaft 18 and the output shaft 84.

To shift from the reverse speed ratio to the first forward speed ratio, the first synchronizer 62 is preselected (i.e., engaged) prior to shifting from the second shifting clutch 46 to the first shifting clutch 42. The first shifting clutch 42 is then engaged as the second shifting clutch 46 is disengaged. The seventh synchronizer 74 is then disengaged.

In the first forward speed ratio, torque is transferred from the input shaft 18 to the first countershaft 40 via the intermeshing first transfer gear 34 and third transfer gear 38. Torque is transferred from the first countershaft 40 to the output shaft 84 via the intermeshing first intermeshing gear 48 and eighth intermeshing gear 76.

To shift from the first forward speed ratio to the second forward speed ratio, the second synchronizer 64 is preselected during the first forward speed ratio. The first shifting clutch 42 is then disengaged as the second shifting clutch 46 is engaged. The first synchronizer 62 is then disengaged. With the engagement of the second shifting clutch 46 and the second synchronizer 64, torque is transferred from the input shaft 18 to the second countershaft 44 via the intermeshing third transfer gear 38 and second transfer gear 36. Torque is transferred from the second countershaft 44 to the output shaft 84 via the intermeshing second intermeshing gear 50 and eighth intermeshing gear 76 to establish the second forward speed ratio.

Because the second shifting clutch 46 is not engaged during the first forward speed ratio, preselection of the second synchronizer 64 does not effect the first forward speed ratio. Preselection of the synchronizer required for the subsequent speed ratio occurs during each previous speed ratio in the transmission 15. Such preselection allows dynamic shifting to occur. "Dynamic shifting" means that output torque is present during a clutch shift to an oncoming speed ratio.

To shift from the second speed ratio to the third speed ratio, the third synchronizer 66 is preselected (i.e., engaged) during the second speed ratio. The second shifting clutch 46 is then disengaged as the first shifting clutch 42 is engaged. The second synchronizer 64 is then disengaged. With the engagement of the first shifting clutch 42 and the third synchronizer 66, torque is transferred from the input shaft 18 to the first countershaft 40 via the intermeshing first transfer gear 34 and third transfer gear 38. Torque is transferred from the first countershaft 40 to the output shaft 84 via the intermeshing third intermeshing gear 52 and ninth intermeshing gear 78 to establish the third forward speed ratio.

To shift from the third forward speed ratio to the fourth forward speed ratio, the fourth synchronizer 68 is preselected (i.e., engaged) during the third forward speed ratio. The second shifting clutch 46 is then engaged as the first shifting clutch 42 is disengaged. The third synchronizer 66 is then disengaged. With the engagement of the second shifting clutch 46 and the fourth synchronizer 68, torque is transferred from the input shaft 18 to the second countershaft 44 via the intermeshing second transfer gear 36 and third transfer gear 38. Torque is transferred from the second countershaft 44 to the output shaft 84 via the fourth intermeshing gear 54 and ninth intermeshing gear 78 to establish the fourth forward speed ratio.

To shift from the fourth forward speed ratio to the fifth forward speed ration, the fifth synchronizer 70 is preselected (i.e., engaged) during the fourth forward speed ratio. The second shifting clutch 46 is disengaged as the first shifting clutch 42 is engaged. The fourth synchronizer 68 is then disengaged. With the engagement of the first shifting clutch 42, torque is transferred from the input shaft 18 to the first countershaft 40 via the intermeshing first transfer gear 34 and third transfer gear 38. The engaged fifth synchronizer 70 permits torque to be transferred from the first countershaft 40 to the output shaft 84 via the fifth intermeshing gear 56 and tenth intermeshing gear 80 to establish the fifth forward speed ratio.

To shift from the fifth forward speed to the sixth forward speed ratio, the sixth synchronizer 72 is preselected (i.e., engaged) during the fifth forward speed ratio. The second shifting clutch 46 is then engaged as the first shifting clutch 42 is disengaged. The fifth synchronizer 70 is then disengaged. With the engagement of the second shifting clutch 46 and the sixth synchronizer 72, torque is transferred from the input shaft 18 to the second countershaft 44 via the intermeshing second transfer gear 36 and third transfer gear 38, and from the second countershaft 44 to the output shaft 84 via the sixth and tenth intermeshing gears 58, 80, to establish the sixth forward speed ratio.

The eighth, ninth, tenth and eleventh gears are a first group, each being continuously connected with the output shaft 84. The first transfer gear 34, and the first, third and fifth intermeshing gears 48, 52, 56, respectively, are a second group, each being selectively interconnectable with the first shaft 40. The second transfer gear 36, and the second, fourth, sixth and seventh intermeshing gears 50, 54, 58 and 60 are a third group, each being selectively interconnectable with the second shaft 44.

Figure 2:
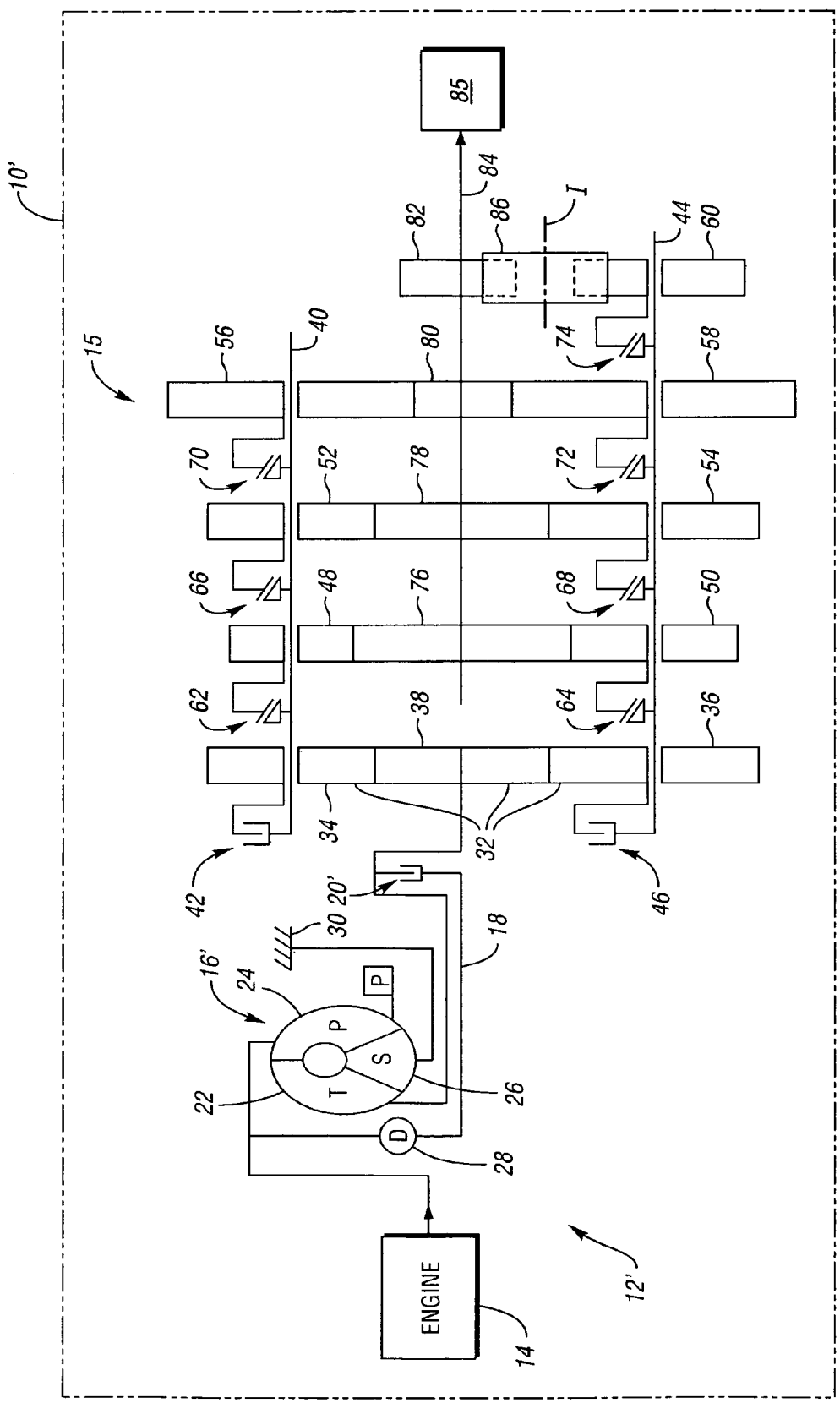
FIG. 2 is a schematic illustration of a second embodiment of a vehicle having a powertrain with an engine, a torque converter and a transmission with dual input clutches.

Second Embodiment: Dual Input Clutch, Countershaft Design on Three Axes with Torque Converter Clutch External to Torque Converter Referring to FIG. 2, a vehicle 10' having a powertrain 12', similar to the powertrain train 12 of FIG. 1, is illustrated. The powertrain 12' is different from that shown in FIG. 1 in that the torque converter clutch 20' is moved outside of the torque converter 16'. Otherwise, each of the components of the vehicle 10' operates substantially the same as the correspondingly numbered components of the vehicle of FIG. 1. As discussed above, such relocation of the torque converter clutch enables spacing flexibility to permit an increased size and or/number of plates in the torque converter clutch and avoids the influence of torque converter pressure on the torque converter clutch.

Third Embodiment: Dual Input Clutch, Coaxial Shaft Design on Two Axes

Figure 3:
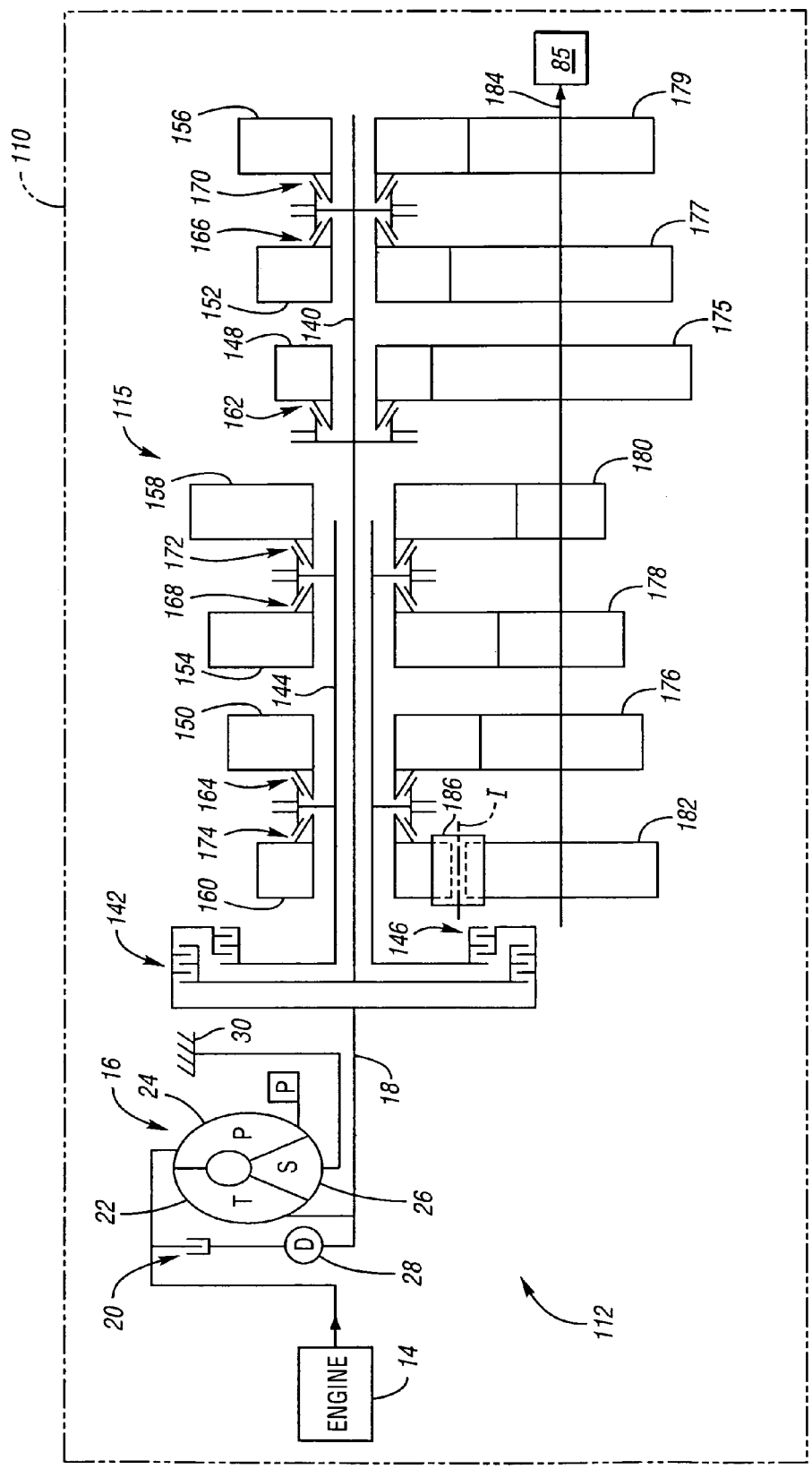
FIG. 3 is a schematic illustration of a third embodiment of a vehicle having a powertrain with an engine, a torque converter and a transmission with dual input clutches.

Referring to FIG. 3, a vehicle 110 having a powertrain 112 including a torque converter 16 and transmission 115 is illustrated. The engine 14 and torque converter 16 are connected with the input shaft 18 in identical fashion to that of FIG. 1. Dual input clutches 142, 146 may be alternately selectively engaged to provide torque from the input shaft 18 to the first and second shafts 140, 144, respectively. First, third and fifth intermeshing gears 148, 152, 156, respectively, are selectively engageable with the first shaft 140 via the first, third and fifth synchronizers, 162, 166, 170, respectively. Second, fourth and sixth intermeshing gears, 150, 154, 158, respectively, are rotatable about and selectively engageable with the second countershaft 144 via second, fourth and sixth synchronizers 164, 168 and 172, respectively. Additionally, a seventh or reverse gear 160 is selectively engageable with the second shaft 144 via a seventh synchronizer 174. Eighth, ninth, tenth, eleventh, twelfth, thirteenth and fourteenth intermeshing gears 176, 178, 180, 182, 175, 177 and 179, respectively, are continuously connected with an output member 184 which connects to the final drive mechanism 85. In this embodiment, the output member 184 is a shaft, and may be referred to as an output shaft. Idler gear 186 is rotatable about an axis I and intermeshes with both the seventh/reverse gear 160 and the eleventh intermeshing gear 182.

The eighth through fourteenth gears 175, 176, 177, 178, 179, 180, 182 are a first group continuously connected with the output shaft 84. The first, third and fifth gears 148, 152, 156 are a second group, each being selectively interconnectable with the first shaft 140. The second, fourth, sixth and seventh gears 150, 154, 158, 160 are a third group, each selectively interconnectable with the second shaft 144.

The input shaft 18 and the coaxial first and second countershafts 140, 144 establish a first axis. The output shaft 184 establishes a second axis spaced form the first axis.

The clutches 142, 146 and synchronizers 162, 164, 166, 168, 170, 172 and 174 are selectively engageable to transfer torque through the intermeshing gears from the input shaft 18 to the output shaft 184 and establish multiple speed ratios as will be well understood by those skilled in the art based upon the description of clutch and synchronizer engagements with respect to FIG. 1.

Fourth Embodiment: Dual Output Clutch, Coaxial Shaft Design on Two Axes

Figure 4:
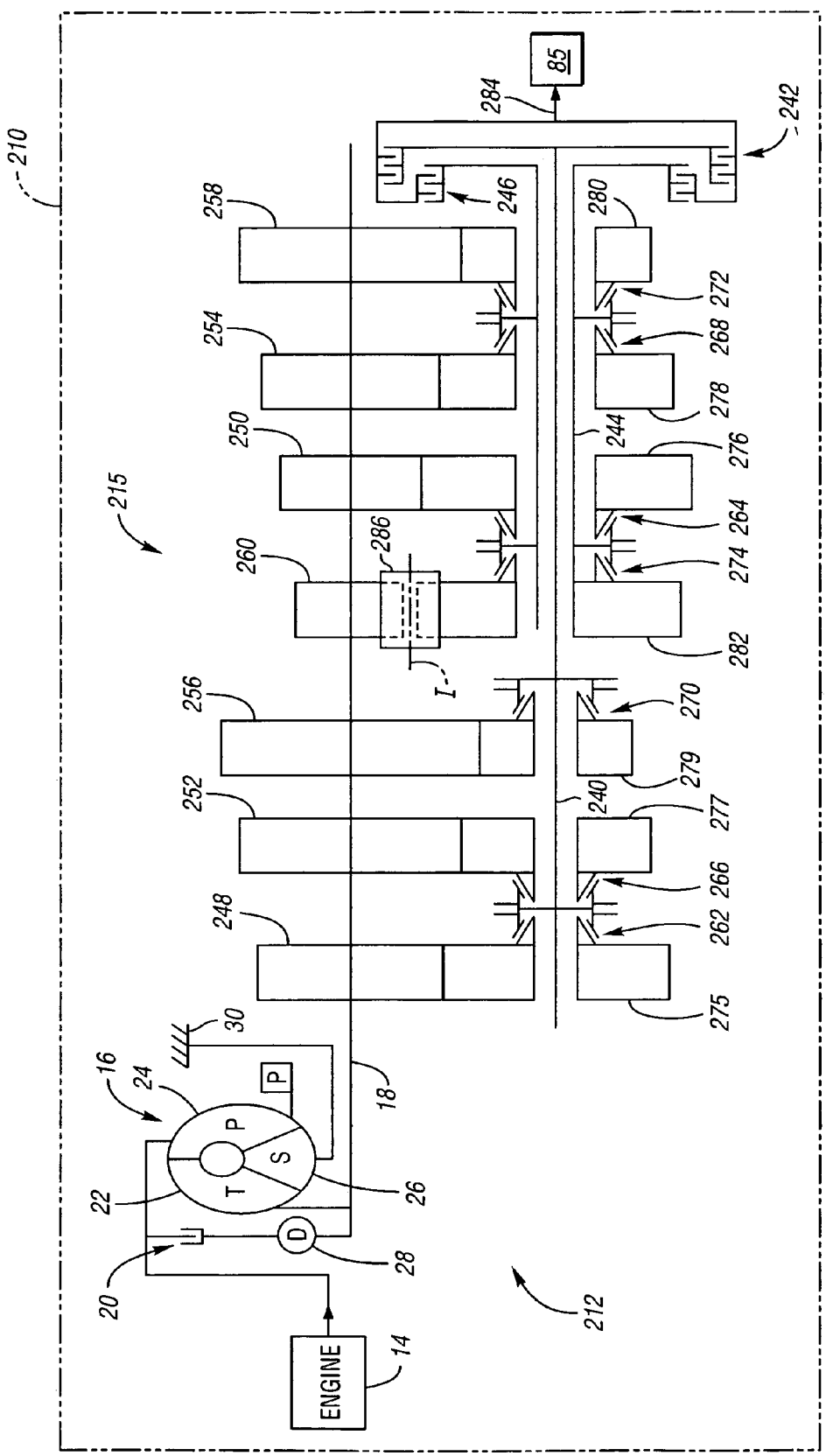
FIG. 4 is a schematic illustration of a fourth embodiment of a vehicle having a powertrain with an engine, a torque converter and a transmission with dual output clutches.

Referring to FIG. 4, a vehicle 210 having a powertrain 212 including a torque converter 16 and transmission 215 is illustrated. The torque converter 16 is connected between the engine 14 and the input shaft 18 in an identical manner as that described with respect to FIG. 1. The transmission 215 includes a plurality of intermeshing gears some of which are continuously connected with the input shaft 18 and transfer torque to one of a first shaft 240 or a coaxial second shaft 244 depending upon synchronizer engagements. Dual output clutches 242, 246 are alternately selectively engageable with the first and second shaft 240, 244, respectively to transfer torque to an output member 284 and to the final drive mechanism 85. In this embodiment, the output member 284 is a shaft and may be referred to as an output shaft.

A first intermeshing gear 248 intermeshes with a twelfth intermeshing gear 275 which is selectively engageable with (i.e., interconnectable for rotation with) the first shaft 240 via a first synchronizer 262. A third intermeshing gear 252 is continuously connected with the input shaft 18 and intermeshes with a thirteenth intermeshing gear 277 which is selectively engageable with the first shaft 240 via a third synchronizer 266. A fifth intermeshing gear 256 is continuously interconnected with the input shaft 18 and intermeshes with a fourteenth intermeshing gear 279 which is selectively engageable with the first shaft 240 via a fifth synchronizer 270. A seventh intermeshing gear 260 is continuously connected with the input shaft 18 and intermeshes with an idler gear 286 which rotates about an idler axis I. The idler gear 286 also intermeshes with an eleventh intermeshing gear 282 which is selectively engageable with the second shaft 244 via the seventh synchronizer 274. A second intermeshing gear 250 is continuously connected with the input shaft 18 and intermeshes with an eighth intermeshing gear 276 which is selectively engageable with the second shaft 244 via a second synchronizer 264. A fourth intermeshing gear 254 is continuously connected with the input shaft 18 and intermeshes with a ninth intermeshing gear 278 which is selectively engageable with the second shaft 244 via a fourth synchronizer 268. A sixth intermeshing gear 258 is continuously connected and rotates with an input shaft 18. The sixth intermeshing gear 258 intermeshes with a tenth intermeshing gear 280 which is selectively engageable with the second shaft 244 via a sixth synchronizer 272.

The first, second, third, fourth, fifth, sixth and seventh gears 248, 250, 252, 254, 256, 258 and 260, respectively, are a first group continuously connected with the input shaft 18. The twelfth, thirteenth and fourteenth gears 275, 277 and 279, respectively, are a second group, each being selectively interconnectable with the first shaft 240. The eighth, ninth, tenth and eleventh gears 276, 278, 280 and 282 are a third group, each selectively connectable with the second shaft 244.

The input shaft 18 establishes a first axis. The coaxial first and second shafts 240, 244 and the output shaft 284 establish a second axis.

The output clutches 242, 246 and synchronizers 262, 264, 266, 268, 270, 272 and 274 are selectively engageable to establish six forward speed ratios and a reverse speed ratio in a similar manner as described with respect to FIG. 1, as will be readily understood by those skilled in the art.

Fifth Embodiment: Dual Output Clutch, Counter Shaft Design on Three Axes

Figure 5:
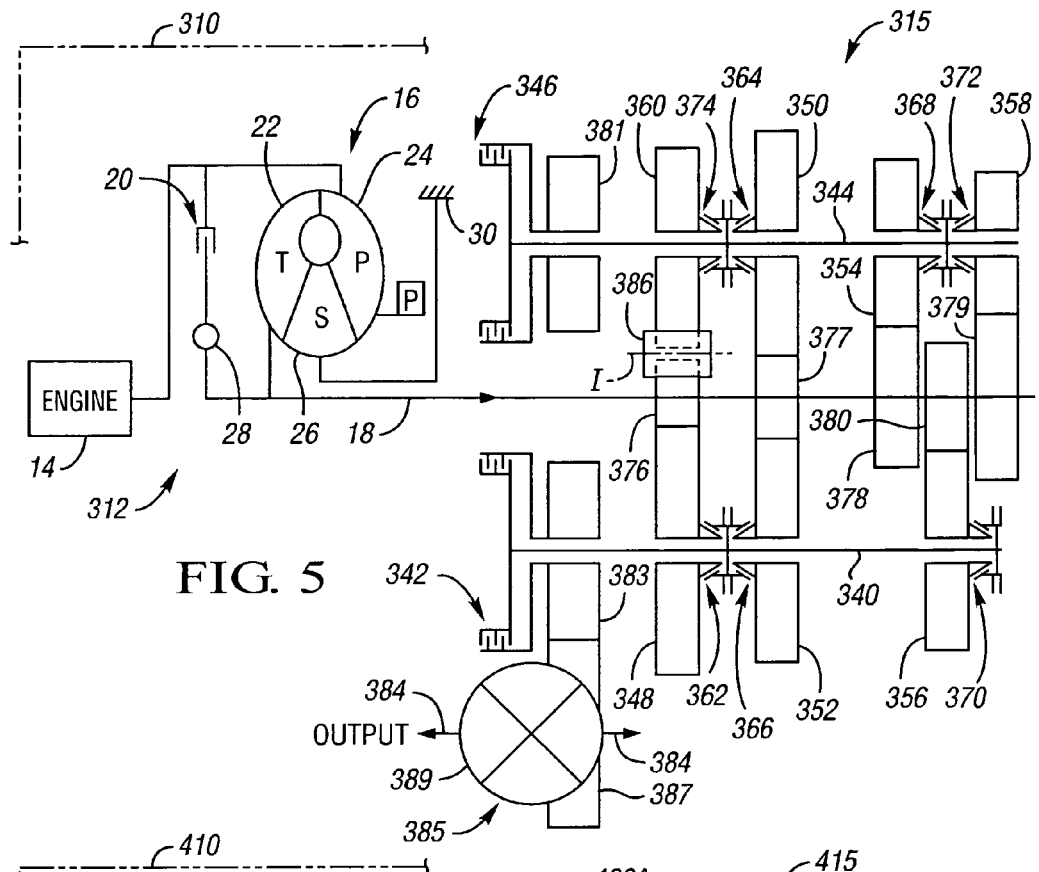
FIG. 5 is a schematic illustration of a fifth embodiment of a vehicle having a powertrain with an engine, a torque converter and a transmission with dual output clutches.

Referring to FIG. 5, a vehicle 310 having a powertrain 312 is illustrated. The powertrain 312 includes an engine 14, a torque converter 16, with a transmission 315 having an input shaft 18 and an output member 384, and a final drive 385. The torque converter 16 is connected between the engine 14 and the input shaft 18 in an identical manner to that described with respect to FIG. 1, above.

An eighth intermeshing gear 376, a thirteenth intermeshing gear 377, a ninth intermeshing gear 378, a tenth intermeshing gear 380 and a fourteenth intermeshing gear 379 are continuously connected to and rotate with the input shaft 18. First and second counter shafts 340, 344, respectively, are spaced from the input shaft 18 and are substantially parallel thereto. A first intermeshing gear 348 intermeshes with an eighth intermeshing gear 376 and is selectively engageable with the first shaft 340 via a first synchronizer 362. A third intermeshing gear 352 intermeshes with the thirteenth intermeshing gear 377 and is selectively engageable with the first shaft 340 via a third synchronizer 366. A fifth intermeshing gear 356 intermeshes with the tenth intermeshing gear 380 and is selectively engageable with the first shaft 340 via a fifth synchronizer 370. An idler gear 386 rotates about an idler axis I and intermeshes with the eighth intermeshing gear 376. A seventh intermeshing gear 360 also intermeshes with the idler gear 386 and is selectively engageable with the second shaft 344 via a seventh synchronizer 374. A second intermeshing gear 350 intermeshes with the thirteenth intermeshing gear 377 and is selectively engageable with the second shaft 344 via a second synchronizer 364. A fourth intermeshing gear 354 intermeshes with the ninth intermeshing gear 378 and is selectively engageable with the second counter shaft 344 via a fourth synchronizer 368. A sixth intermeshing gear 358 intermeshes with the fourteenth intermeshing gear 379 and is selectively engageable with the second shaft 344 via a sixth synchronizer 372. First and second clutches 342, 346, respectively, form dual output clutches and when selectively engaged transfer torque from the first and second shaft 340, 344, respectively. The first clutch 342 may be selectively engaged to transfer torque from the first shaft 340 to a sixteenth intermeshing gear 383 which intermeshes with a seventeenth intermeshing gear 387, which may be referred to as the final drive ring gear. The seventeenth intermeshing gear 387 may be referred to as a final drive ring gear, and intermeshes with an output differential 389 to transfer torque to the output member 384. The second clutch 346 is selectively engageable to transfer torque from the second shaft 344 to a fifteenth intermeshing gear 381.

The eighth, ninth, tenth, thirteenth and fourteenth gears 376, 378, 380, 377 and 379, respectively, are a first group, each being continuously connected with the input shaft 18 for rotation therewith. The first, third and fifth gears 348, 352 and 356, respectively, are a second group, each being selectively interconnectable with the first shaft 340. The second, fourth, sixth and seventh gears 350, 354, 358 and 360, respectively, are a third group, each being selectively interconnectable with the second shaft 344.

The input shaft 18 establishes a first axis. The first and second shafts 340, 344, respectively, establish second and third axes spaced from and parallel to the input shaft 18. The output member 384 is on a fourth axis.

The clutches 342 and 346 as well as the synchronizers 362, 364, 366, 368, 370, 372 and 374 are selectively engageable to transfer torque between the input shaft 18 and the output member 384 to establish six forward speed ratios and a reverse speed ratio as will be well understood by those skilled in the art based upon the description of clutch and synchronizer engagements of FIG. 1.

Sixth Embodiment: Dual Input Clutch, Coaxial Shaft Design on Three Axes

Figure 6:
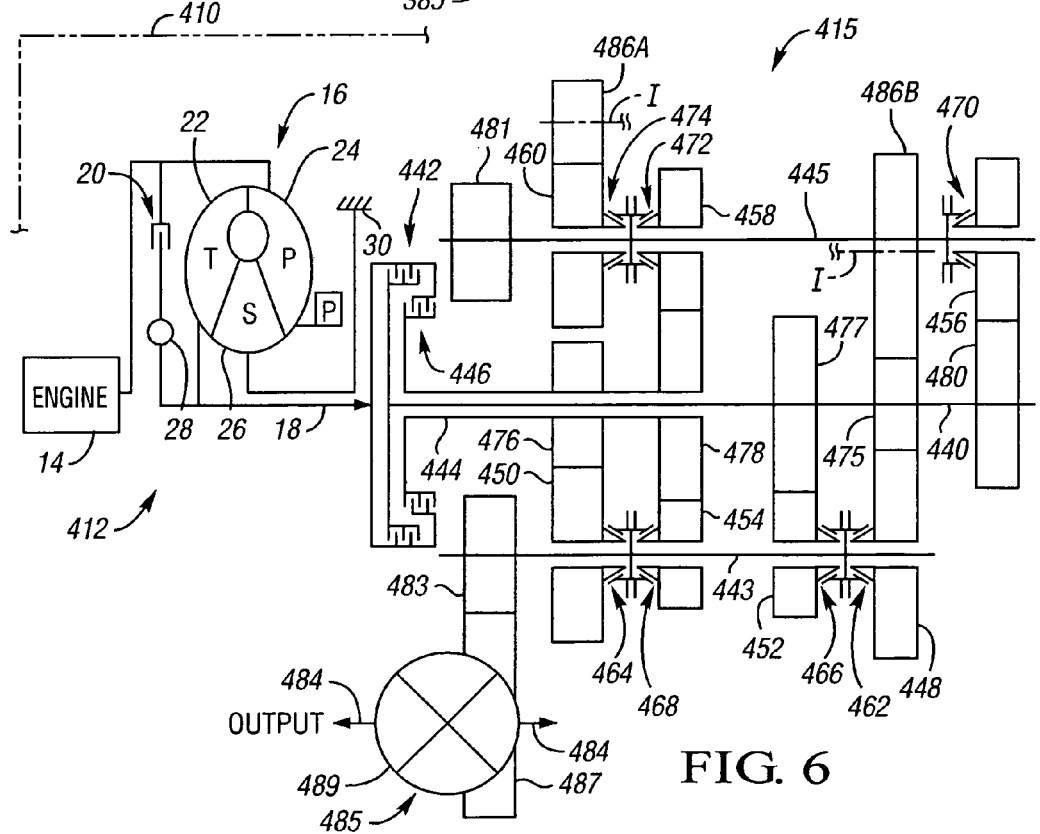
FIG. 6 is a schematic illustration of a sixth embodiment of a vehicle having a powertrain with an engine, a torque converter and a transmission with dual input clutches.

Referring to FIG. 6, a vehicle 410 having a powertrain 412 is illustrated. The powertrain includes an engine 14 and a torque converter 16 connected between the engine 14 and the input shaft 18 in an identical manner as that described with respect to FIG. 1. The powertrain further includes a transmission 415 that has dual input clutches 442, 446 and a plurality of intermeshing gears and synchronizers selectively engageable to transfer torque from the input shaft 18 to an output member 484. First and second clutches 442, 446 are alternately engageable to transfer torque from the input shaft 18 to first and second shafts 440, 444, respectively.

A thirteenth intermeshing gear 477, a twelfth intermeshing gear 475, and a tenth intermeshing gear 480 are continuously connected to and rotate with the first shaft 440. An eighth intermeshing gear 476 and a ninth intermeshing gear 478 are continuously connected to and rotate with the second shaft 444. A second intermeshing gear 450 intermeshes with the eighth intermeshing gear 476 and is selectively engageable with a third shaft 443 via a second synchronizer 464. A fourth intermeshing gear 454 intermeshes with the ninth intermeshing gear 478 and is selectively engageable with the third shaft 443 via a fourth synchronizer 468. A third intermeshing gear 452 intermeshes with the thirteen intermeshing gear 477 and is selectively engageable with the third shaft 443 via a third synchronizer 466. A first intermeshing gear 448 intermeshes with the twelfth intermeshing gear 475 and is selectively engageable with the third shaft 443 via a first synchronizer 462. A sixteenth intermeshing gear 483 is continuously connected to shaft 443 and intermeshes with a seventeen intermeshing gear 487 (a final drive ring gear) which in turn intermeshes with a differential 489 to transfer torque to the output member 484.

A sixth intermeshing gear 458 intermeshes with the ninth intermeshing gear 478 and is selectively engageable with the fourth shaft 445 via a sixth synchronizer 472. A fifth intermeshing gear 456 intermeshes with the tenth intermeshing gear 480 and is selectively engageable with the fourth shaft 445 via a fifth synchronizer 470. A seventh or reverse gear 460 rotates about and is selectively engageable with the fourth shaft 445 via a seventh synchronizer 474. The first idler gear 486A is continuously connected to a shaft that rotates about axis I and intermeshes with the seventh intermeshing gear 460 when the second clutch 446 is engaged. The second idler gear 486B intermeshes with the twelfth intermeshing gear 475 and, although not shown geometrically in the two-dimensional layout of FIG. 6, is continuously connected to the same shaft that rotates about the axis I as the first idler gear 486A and is therefore able to transfer torque between the first shaft 440 and the fourth shaft 445 when the first clutch 442 and the seventh synchronizer 474 are engaged. A fifteen intermeshing gear 481 is continuously connected with the fourth shaft 445 and, although not shown in the two dimensional schematic of FIG. 6, also intermeshes with the seventeenth intermeshing gear 487 to transfer torque to the differential 489 and the output member 484, as will be well understood by those skilled in the art. The fifteenth intermeshing gear 481, the sixteenth intermeshing gear 483, the seventeenth intermeshing gear 487 and the differential 489 together establish a final drive 485.

The tenth, twelfth and thirteenth gears 480, 475 and 477, respectively, are a first group, each being continuously connected with the first shaft 440. The first, second, third and fourth gears 448, 450, 452, and 454, respectively, are a second group, each being selectively interconnectable with the third shaft 443. The fifth, sixth and seventh gears 456, 458 and 460, respectively, are a third group, each being selectively interconnectable with the fourth shaft 445. The eighth and ninth intermeshing gears 476, 478 are continuously connected to the second shaft 444.

The input shaft and coaxial first and second shafts 440, 444 establish a first axis. The third and fourth shafts 443, 445, respectively, establish second and third axes spaced from and parallel to the input shaft 18. The output member 484 is on a fourth axis.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission for transmitting power from a power source, the transmission comprising:
   an input member;
   an output member;
   a torque converter operatively connected between said input member and the power source to create a fluid coupling therebetween;
   a first shaft;
   a second shaft;
   seven selectively engageable synchronizers;
   a plurality of intermeshing gears; some of said gears being continuously connected with one of said input member, said output member, said first shaft and said second shaft for rotation therewith; others of said gears each being selectively interconnectable with another one of said input member, said output member, said first shaft and said second shaft via selective engagement of a respective one of said synchronizers;
   a first and a second clutch alternately selectively engageable for operatively interconnecting said respective first and second shafts with one of said input member and said output member; and
   said selective engagement of said clutches and said synchronizers thereby operatively interconnecting said input member with said output member through said intermeshing gears to transfer power provided from the power source to said output member at six forward speed ratios and one reverse speed ratio.

2. The multi-speed transmission of claim 1, further comprising:
   a torque-converter clutch operatively engageable to establish a mechanical connection between the power source and said output member which bypasses said torque converter.

3. The multi-speed transmission of claim 1, wherein said first and second shafts are spaced generally parallel to said input member and said output member in a countershaft design.

4. The multi-speed transmission of claim 3, wherein alternate selective engagement of said first and second clutches operatively interconnects said input member with said first and second shafts, respectively.

5. The multi-speed transmission of claim 3, wherein alternate selective engagement of said first and second clutches operatively interconnects said first and second shafts, respectively, with said output member.

6. The multi-speed transmission of claim 1, wherein said first and second shafts are coaxial.

7. The multi-speed transmission of claim 6, wherein alternate selective engagement of said first and second clutches operatively interconnects said input member with said first and second shafts, respectively.

8. The multi-speed transmission of claim 6, wherein alternate selective engagement of said first and second clutches operatively interconnects said first and second shafts, respectively, with said output member.

9. The multi-speed transmission of claim 1, wherein said input member, said output member, said first shaft and said second shaft are arranged to establish two axes.

10. The multi-speed transmission of claim 1, wherein said input member, said output member, said first shaft and said second shaft are arranged to establish at least three axes.

11. A powertrain comprising:
    a power source;
    an input member;
    a torque converter operatively connected between said power source and said input member;
    an output member axially displaced from and collinear with said input member;
    a first shaft;
    a second shaft;
    fifteen intermeshing gears, fourteen of which are each concentric with one of said input member, said output member, said first shaft and said second shaft;
    seven synchronizers, each of said synchronizers being selectively engageable for interconnecting a respective one of said gears with one of said input member, said output member, said first shaft and said second shaft;
    a first and a second clutch alternately selectively engageable for operatively interconnecting said respective first and second shafts with one of said input member and output member; and said selective engagement of said clutches and said synchronizers thereby transferring torque from said input member to said output member through said intermeshing gears at six forward speed ratios and one reverse speed ratio.

12. A multi-speed transmission of claim 11, further comprising:
a torque-converter clutch operatively engageable to establish a mechanical connection between the power source and said output member which bypasses said torque converter.

13. The multi-speed transmission of claim 11, wherein said first and second shafts are spaced generally parallel to said input member and said output member in a countershaft design.

14. The multi-speed transmission of claim 13, wherein alternate selective engagement of said first and second clutches operatively interconnects said input member with said first and second shafts, respectively.

15. The multi-speed transmission of claim 13, wherein alternate selective engagement of said first and second clutches operatively interconnects said first and second shafts, respectively, with said output member.

16. The multi-speed transmission of claim 11, wherein said first and second shafts are coaxial.

17. The multi-speed transmission of claim 16, wherein alternate selective engagement of said first and second clutches operatively interconnects said input member with said first and second shafts, respectively.

18. The multi-speed transmission of claim 16, wherein alternate selective engagement of said first and second clutches operatively interconnects said first and second shafts, respectively, with said output member.

19. A powertrain comprising:
a power source;
an input member;
a torque converter operatively connected between said power source and said input member;
an output member;
a first shaft;
a second shaft;
fifteen gears, each of said gears intermeshing with at least one other of said gears, wherein, said output member has a first group of four of said fifteen gears continuously connected thereto for rotation therewith, wherein a second group of four of said fifteen gears and a third group of five of said fifteen gears are selectively interconnectable with said first shaft and said second shaft, respectively, for rotation therewith, wherein one of fifteen gears is continuously connected for rotation with said input member and wherein another of said fifteen gears is an idler gear intermeshing with one of said gears in said first group and one of said gears in said third group;
seven synchronizers each being selectively engageable for interconnecting one of said gears in said second or said third group with one of said first shaft and said second shaft for rotation therewith;
a first and a second clutch alternately selectively engageable for operatively interconnecting said respective first and second shafts with said input member; and
said selective engagement of said clutches and said synchronizers thereby transferring torque from said input member to said output member through said intermeshing gears at multiple speed ratios.

* * * * *